Jan. 14, 1941. G. E. GAREY 2,228,265
BASIN PACKER
Filed Aug. 18, 1938 3 Sheets-Sheet 1
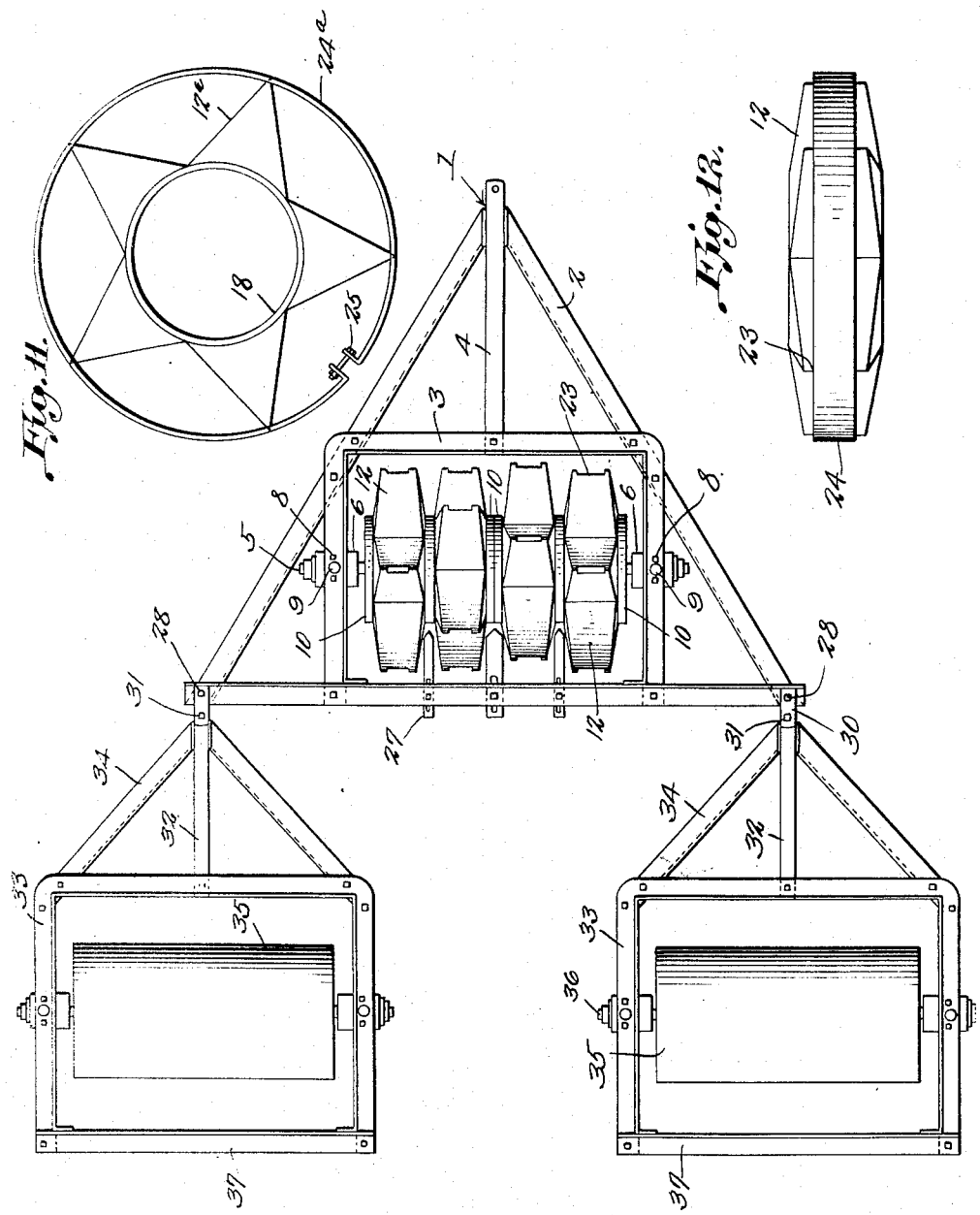
George E. Garey.
INVENTOR.
BY CASnow&Co.
ATTORNEYS.

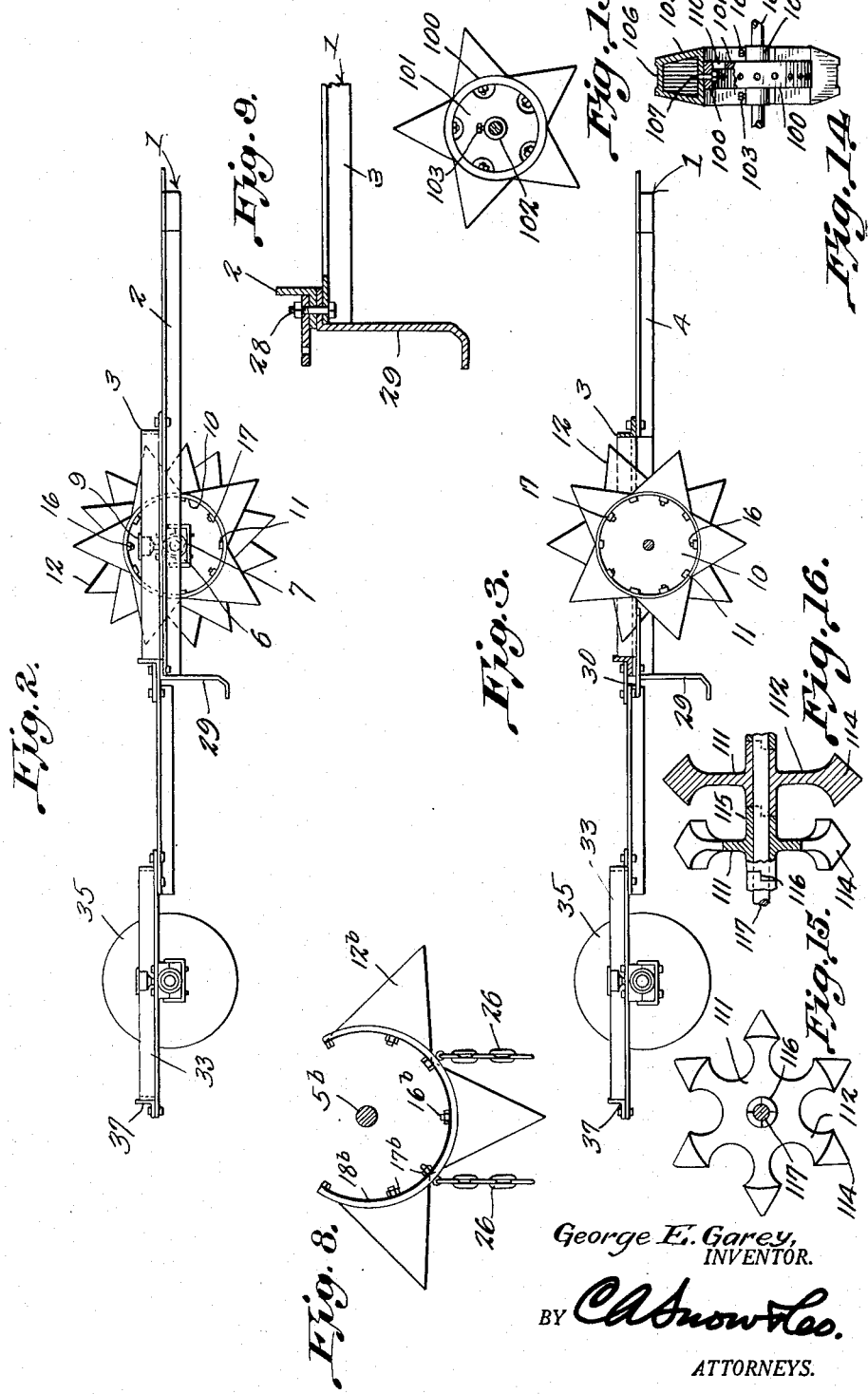

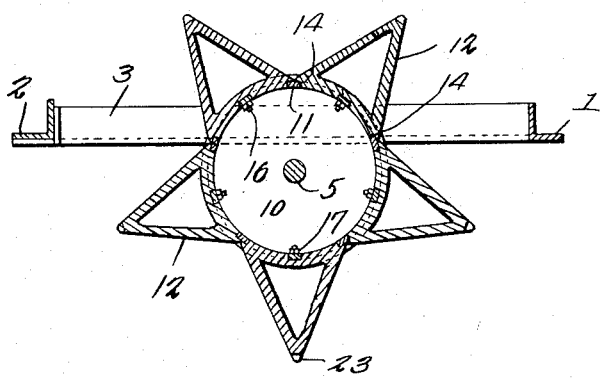
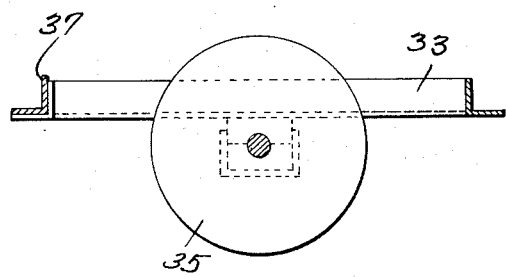
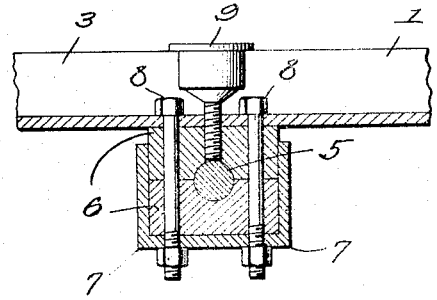
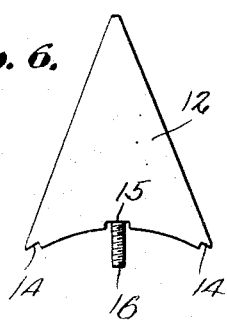
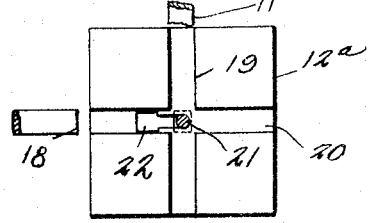

Patented Jan. 14, 1941

2,228,265

UNITED STATES PATENT OFFICE 2,228,265

BASIN PACKER

George E. Garey, Downs, Kans.

Application August 18, 1938, Serial No. 225,604

8 Claims. (Cl. 55—77)

The device forming the subject matter of this application is an agricultural machine, and the invention aims to provide a device of the class described, which, when drawn over the ground, will put basins in the ground, thereby holding the water and keeping the top soil from washing away, the ground being left rough on top, and the soil being prevented from blowing about. In the spring of the year, after the ground has settled, the machine can be run over cracked ground in which the cracks have been caused by freezing, or be run over wheat ground, to stop it from blowing. The machine is adapted to perforate the ground, after plowing, the perforation extending to a depth of several inches, and admitting sunlight to the soil, to the well known advantage thereof. The machine is a subsurface packer, which will press heavy stubble firmly under the plowing, removing air pockets and holding the moisture in the sub-soil, the basins produced serving to catch and hold water on the surface of the soil. The device is so constructed that it will pack basins in the ground, rather than dig holes and loosen the soil. The ordinary practice is to harrow the soil, but harrowing leaves the surface of the soil so smooth that it will cement over, the surface water and the top soil running away.

A further object of the invention is to provide, in a device of the class described, a rotor supplied with lugs so made that they will penetrate deeply into newly plowed ground, but, at the same time, the lugs are not sharp enough to cut vegetation, such as wheat. A further object of the invention is to supply a machine of the kind described in which the cylinders will not touch the ground and pulverize it, the ground being left in its rough and natural state, with small clods on the top, and with adequately packed basins for the purpose hereinbefore mentioned.

Large quantities of discarded combine cylinders are available, and the present invention aims to provide means whereby such cylinders may be put to a new use, the cylinders possessing a greater value than they would have if sold for junk, and the cost of the present machine being cut down, nevertheless, on account of the fact that such cylinders need not be manufactured especially for use in the machine.

Other and further advantages and novel features of structure will be brought out as the description proceeds, and the invention aims to improve generally and to enhance the utility of devices of that type to which the disclosure herein presented appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention;

Fig. 2 is a side elevation;

Fig. 3 is a longitudinal section;

Fig. 4 is a transverse section taken through the rotor;

Fig. 5 is a sectional view disclosing one of the bearings;

Fig. 6 is an elevation showing one of the lugs;

Fig. 7 is a bottom plan showing a modified lug;

Fig. 8 is a modification showing chains which may be used in connection with the rotors, if desired;

Fig. 9 is a fragmental vertical section illustrating one of the skids;

Fig. 10 is a section taken through one of the packing instrumentalities;

Fig. 11 is an end elevation but showing a modified form of the invention, together with the tread ring;

Fig. 12 is a plan illustrating the tread ring used in connection with the preferred form of the invention;

Fig. 13 is an end elevation showing a modified form of rotor;

Fig. 14 is an elevation of the structure shown in Fig. 13, at right angles to the showing of Fig. 13, parts being broken away;

Fig. 15 is an end elevation showing a modified rotor;

Fig. 16 is a transverse section of the structure shown in Fig. 15, parts remaining in elevation.

In carrying out the invention, there is provided a first section 1, including a triangular frame 2, having its apex forwardly disposed, the frame being arranged symmetrically with respect to the draft line, as Fig. 1 will show. The numeral 3 marks a U-shaped brace, opening rearwardly, the brace being arranged symmetrically with respect to the draft line. The forward corners of the brace 3 are secured to the converging side bars of the frame 2, and the rear ends of the side bars of the frame 2 are connected to the transverse rear member of the frame 2. The rear end of the draft tongue 4 is secured to the forward portion of the brace 3, and the tongue 4 is secured to the apex of the frame 2. It may be stated at this point that angle members may be used in the construction of the machine, wherever expedient.

An axle 5 is disposed transversely of the brace 3 and is carried by bearing blocks 6 (Fig. 5) the bearing blocks being received in U-shaped holders 7, the holders and the bearing blocks being connected to the side members of the brace 3 by securing elements 8, such as bolts. The side members of the brace 3 are provided with any sutiable means 9 for lubricating the axle 5.

The rotor which is secured to the axle 5 preferably is made up of discarded combine cylinders, secured end to end together. The aforesaid cylinders comprise heads 10 and longitudinal slats 11 connecting the heads. A plurality of hollow teeth, preferably made of cast metal, are provided, the teeth being marked by the numeral 12. The teeth 12 have a lateral and outward slant, as shown in Fig. 1, and the teeth converge to a blunted chisel edge. The teeth or lugs are so constructed that they will penetrate deeply into newly plowed ground, but they are not sharp enough to cut vegetation. The slant of the teeth, circumferentially of the rotor, is such that they will compact the soil and form basins, the ground being left rough and in its natural state, with small clods at the surface. The teeth or lugs 12 are staggered around the cylinder, as shown in Fig. 1. In their bases, the lugs 12 have outer seats 14 and an intermediate seat 15. The intermediate seat 15 receives one of the slats 11 of the cylinder and the outer seats 14 of adjacent lugs cooperate to receive others of the slats of the cylinder, as shown in Fig. 4. The means for securing the lugs 14 to the cylinder may be of various kinds. For instance, the lug may have a threaded stud 16, located in the intermediate seat 15 and adapted to receive a nut 17 engaging the corresponding slat 11, as disclosed in Fig. 4. It may be that the cylinder does not have an even number of slats 11. Under such circumstances, recourse is had to the structure shown in Figs. 11 and 7.

In Figs. 7 and 11, a band 18 is secured to the cylinder. The lugs 12a of Figs. 7 and 11 have a first groove or seat 19, to take one of the slats 11 of the cylinder, and they have a second groove or seat 20, at right angles to the element 19. The seat 20 is adapted to receive the supplemental band 18 shown in Fig. 11. The band 18 of Fig. 11 affords support for the lug 12a, circumferentially of the cylinder, and is necessary because the lug 12a is not supported on three of the slats 11, as shown in Fig. 4. The device for fastening the lug 12a in place may be a bolt 21, received in a keyhole slot 22, formed in the base of the lug. The modified fastening shown at 21—22 can be used interchangeably with the threaded stud 16 of Fig. 6. Either in the modified form of Fig. 11, or in the preferred form of Fig. 12, the lugs 12a or 12 are supplied in their outer portions with notches 23, clearly shown in Fig. 1. The notches 23 are adapted to receive a tread band 24 of Fig. 12, or 24a of Fig. 11, the ends of the tread band 24a or 24 being connected by a draw bolt 25 or the like. The tread band 24 or 24a is used when the implement is drawn over a highway, and the purpose of the tread band is to keep the lugs 12 or 12a from puncturing the highway.

In Fig. 8, parts hereinbefore described have been designated by numerals previously used, with the suffix "b." In this form of the invention, flexible elements 26, such as chains, are connected to the rotor, between the lugs 12b. These flexible elements or chains 26 rattle about, by centrifugal action, and tend to keep the lugs 12b clear, in very wet soil. It is not necessary to use the chains 26 in all instances. Scrapers 27 are secured for longitudinal adjustment to the rear member of the frame 2 and extend between the teeth 12 of the rotors.

Securing elements 28 hold depending, rearwardly extended skids 29 on the ends of the rear member of the frame 2. The skids 29 are employed to ease the implement over ditches and low places in the ground. The securing elements 28 hold draft connections 30 on the ends of the rear member of the frame 2, the draft connections carrying pivot elements 31, connected to the tongues 32 of frames 33 sustained by braces 34 from the tongues. In the frames 33, packing rollers 35 are supported by means of axles 36, the supporting means for the axles being, if desired, the structure shown in Fig. 5 of the drawings. The frames 33 are substantial duplicates of the brace 3, aside from the fact that the frames 33 are closed by rear bars 37. When it is desired to pass the structure through a gateway, or other restricted space, the frames 33 may be swung inwardly toward the longitudinal center of the machine, on the pivot elements 31.

In view of what has been stated hereinbefore, it is unnecessary to repeat the operation at this place. The invention affords a means whereby basins can be compacted in the soil, it being possible to build up the rotors by means of old combine cylinders, together with the lugs or teeth shown at 12.

In Figs. 13 and 14, the cylinder is shown at 100, and is short. The cylinder 100 has a single head 101, located at one end of the cylinder. The head 101 carries a central tubular hub 102 provided, on opposite sides of the cylinder, with set screws 103, retaining an axle 104 in the hub 102. The lugs are shown at 105, and are hollow. In their outer edges, they have notches 106, like the notches 23 of Fig. 1, for the reception of the tread band 24 shown in Fig. 12. The lugs 105 are supplied with threaded studs 107, passing inwardly through openings 108 in the cylinder 100. Nuts 109 are threaded on the studs 107, and engage the cylinder 100, to hold the lugs 105 in place. The head 101 of the cylinder 100 has openings 110, giving access to the nuts 109. The length of the hub 102 approximates the width of the lugs 105 at the base, and the set screws 103 are housed within the circle defined by the bases of the lugs. The construction shown in Figs. 13 and 14 is useful where an old combine cylinder is not available.

In Figs. 15 and 16, the rotor comprises any desired number of disks 111, having outstanding radial arms 112, carrying lugs 114, shaped to consummate the function hereinbefore attributed to the lugs. The disks 111 are supplied with tubular hubs 115, receiving an axle 117. The hubs 115 are supplied at their ends with shoulders 116, interlocked against relative rotation, the disks 111 turning together as one piece.

In Figs. 13, 14, 15 and 16, as elsewhere, there is shown a basin-forming rotor for an agricultural machine, comprising a body carrying a plurality of circumferential rows of outstanding V-shaped lugs, the lugs slanting toward their outer ends, circumferentially of the rotor, the lugs of one row being spaced from the lugs of adjoining rows by distances less than the width of any lug, measured lengthwise of the rotor, the aforesaid slant of the lugs being such that they will penetrate the soil and form basins, without cutting vegetation, the lugs supporting the body of the rotor out of contact with the soil, thereby to prevent a pulverizing of the soil. In Figs. 13 and 14, it will be understood that the required duplication will be made, as to the rotors, to accomplish the results last above referred to.

What is claimed is:

1. A basin-forming rotor for an agricultural machine, including a cylinder made up of heads and longitudinal slats, connecting the heads, lugs each having an intermediate seat receiving one slat and outer seats receiving adjoining slats, and means for securing the lugs, each, to said one slat.

2. A basin-forming rotor for an agricultural machine, constructed as set forth in claim 1, and wherein said means includes a stud on each lug, and a nut threaded on the stud.

3. A basin-forming rotor for an agricultural machine, constructed as set forth in claim 1, and wherein said means includes a keyhole slot in the base of the lug, and a bolt detachably received in the slot.

4. A basin-forming rotor for an agricultural machine, constructed as set forth in claim 1, in combination with a supplemental band secured about the slats, divers of the lugs having rectangularly-disposed recesses in their bases, one of said recesses of each lug receiving one slat, and the other of said recesses of each lug receiving the supplemental band.

5. A basin-forming rotor for an agricultural machine, having a plurality of circumferential rows of outstanding lugs so shaped as to penetrate the ground, the lugs of each row having notches in their outer ends, tread bands, and means for securing the tread bands removably in the notches of the rows of lugs, the bands affording circumferentially-continuous surfaces which prevent the lugs from penetrating a highway.

6. A basin-forming rotor for an agricultural machine, comprising a body carrying a plurality of circumferential rows of outstanding V-shaped lugs, the lugs slanting toward their outer ends, circumferentially of the rotor, and transversely of the rotor, the lugs of one row being spaced from the lugs of adjoining rows by distances less than the width of any lug, measured lengthwise of the rotor, the aforesaid transverse and circumferential slants of the lugs being such, relatively to each other, that the lugs will penetrate the soil and form basins, without cutting vegetation, and being such, relatively to each other, that the lugs will support the body of the rotor out of contact with the soil, thereby to prevent a pulverizing of the soil.

7. A basin-forming rotor for an agricultural machine, comprising a body carrying a plurality of circumferential rows of outstanding V-shaped lugs, the lugs slanting toward their outer ends, circumferentially of the rotor, and transversely of the rotor, the lugs of one row being spaced from the lugs of adjoining rows by distances less than the width of any lug, measured lengthwise of the rotor, the aforesaid transverse and circumferential slants of the lugs being such, relatively to each other, that the lugs will penetrate the soil and form basins, without cutting vegetation, and being such, relatively to each other, that the lugs will support the body of the rotor out of contact with the soil, thereby to prevent a pulverizing of the soil, the body of the rotor comprising hubs having releasably interlocking terminal elements effective to secure simultaneous rotation of the hubs, the hubs being provided with outstanding radial arms, the lugs being located at the outer ends of the arms and being wider than the arms.

8. A basin damming rotor for an agricultural machine constructed as set forth in claim 6, and wherein the body comprises a hub and a disk-like head connected to the hub, the hub having a rim, overhanging the hub, the lugs being supplied with studs passing through the rim, securing devices on the studs and engaging the inner surface of the rim, and the head having openings giving access to the securing devices, and means carried by the hub whereby the rotor may be adjusted both circumferentially of an axle and longitudinally thereof.

GEORGE E. GAREY.